No. 672,614. Patented Apr. 23, 1901.
J. DANNER.
PLANT FOR DISPOSAL OF SEWAGE.
(Application filed Apr. 20, 1900.)
(No Model.) 2 Sheets—Sheet 1.
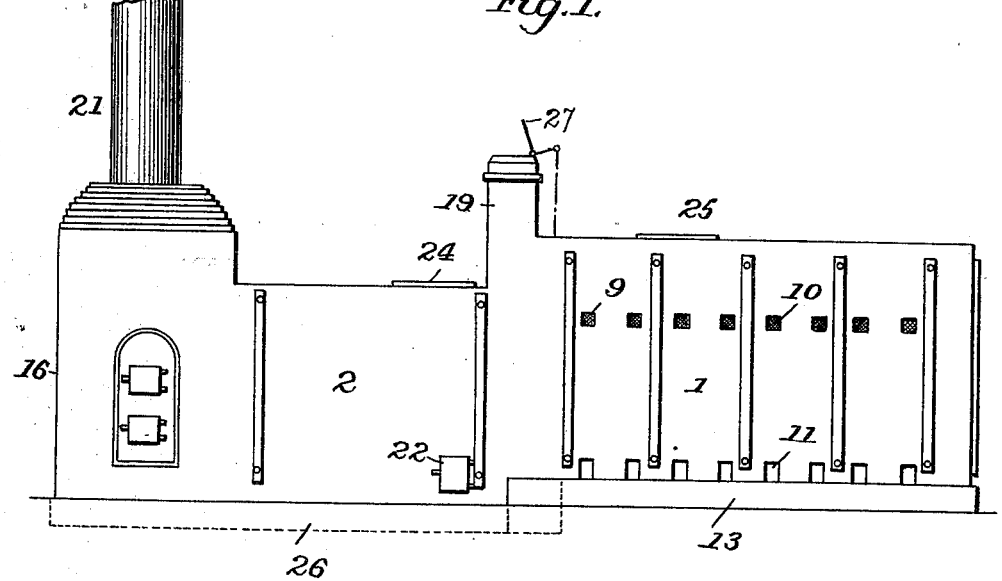
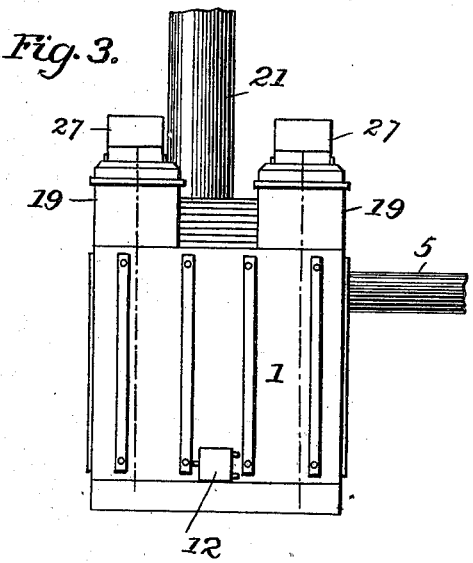
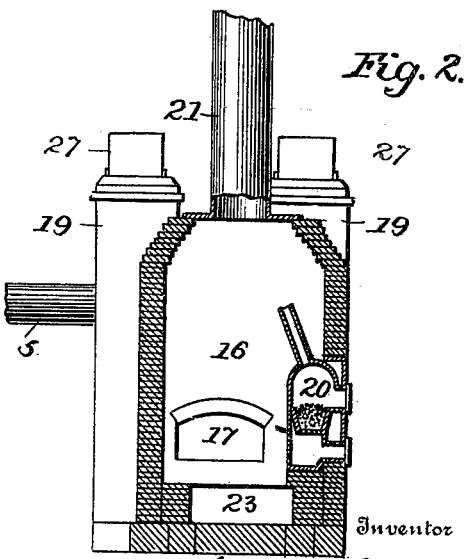
Witnesses
J. G. Hinkel
C. W. Clement
Inventor
Joseph Danner
By Watson & Watson
Attorneys
THE NORRIS PETERS CO., PHOTO-LITHO., WASHINGTON, D. C.

No. 672,614. Patented Apr. 23, 1901.
J. DANNER.
PLANT FOR DISPOSAL OF SEWAGE.
(Application filed Apr. 20, 1900.)
(No Model.) 2 Sheets—Sheet 2.
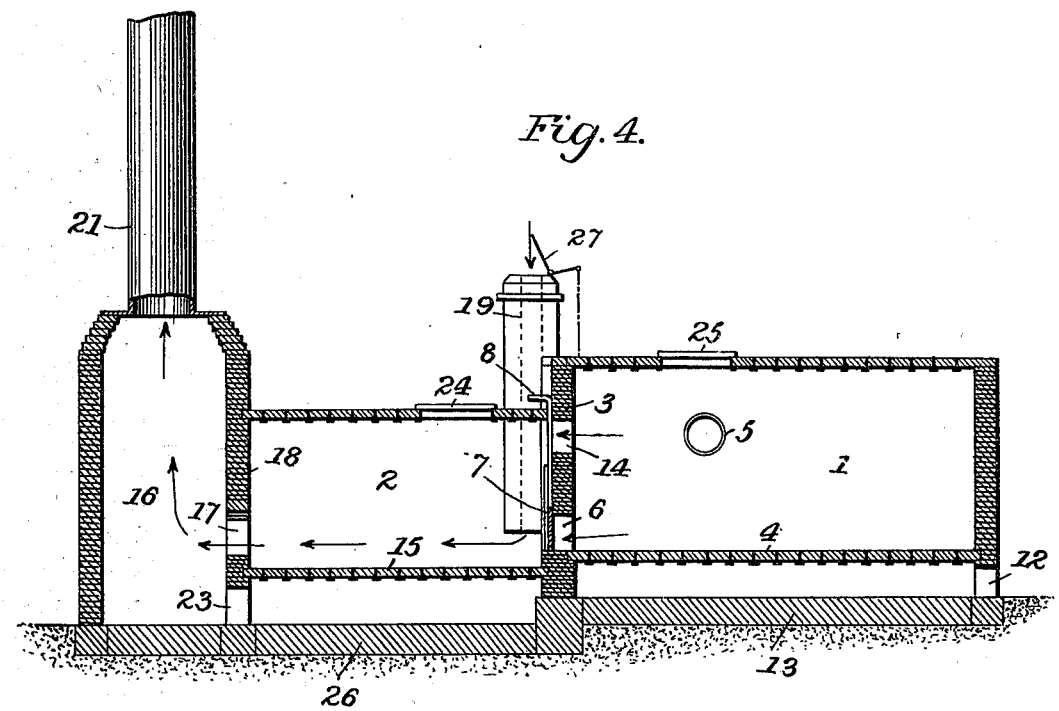
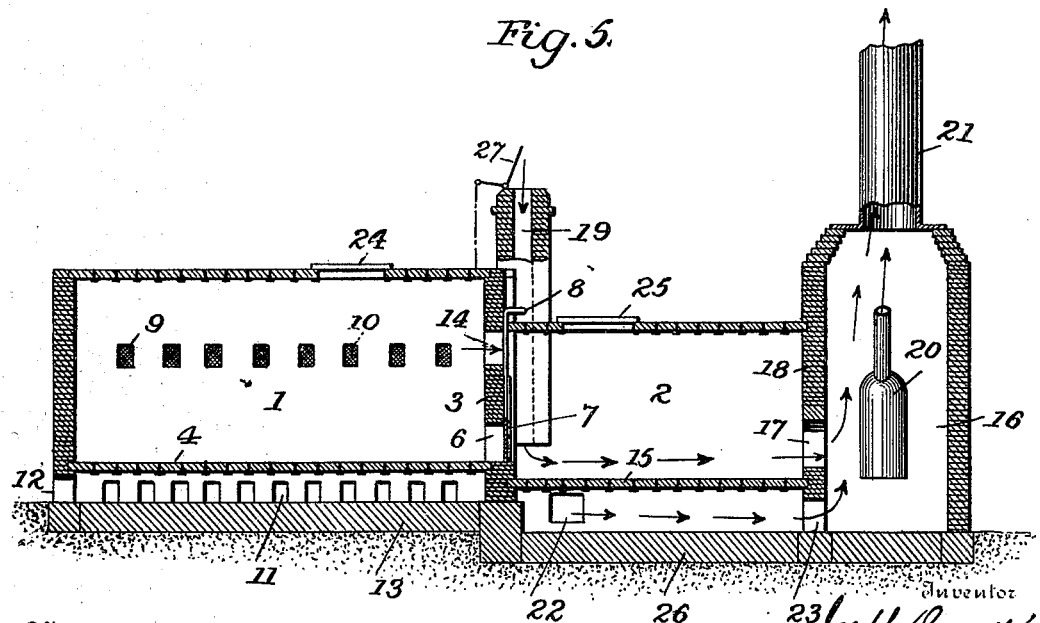

UNITED STATES PATENT OFFICE.

JOSEPH DANNER, OF SCRANTON, PENNSYLVANIA, ASSIGNOR OF ONE-HALF TO JOHN M. KEMMERER, OF SAME PLACE.

PLANT FOR DISPOSAL OF SEWAGE.

SPECIFICATION forming part of Letters Patent No. 672,614, dated April 23, 1901.

Application filed April 20, 1900. Serial No. 13,592. (No model.)

*To all whom it may concern:*

Be it known that I, JOSEPH DANNER, a citizen of the United States, residing at Scranton, in the county of Lackawanna and State of Pennsylvania, have invented certain new and useful Improvements in Plants for the Disposal of Sewage, of which the following is a specification.

My invention relates to improved means for disposing of sewage; and it comprises a plant having a receiving-compartment into which the sewer-pipe empties, said compartment having a porous floor through which the liquid material filters, a drying and cremating compartment adjoining said filtering compartment, and a furnace arranged to create a draft of air through said compartments for the purpose of drying the sediment, carrying off the odors, and burning the gases.

In the accompanying drawings, which illustrate my invention, Figure 1 is a side elevation of my improved plant. Fig. 2 is a front view of the same, the furnace-chamber being shown in section. Fig. 3 is a rear elevation, and Figs. 4 and 5 are central longitudinal vertical sections through the plant looking in opposite directions.

Referring to the drawings, 1 and 2 indicate two compartments of a masonry inclosure, separated by a vertical partition 3. The compartment 1 is provided with a floor 4, composed of brick or other suitable porous material, and the sewer-pipe 5 enters this compartment near the top, as shown in Fig. 4. A gateway 6 is formed in the lower part of the partition 3, and this opening is normally closed by a vertically-sliding gate 7, which may be operated by means of a rod 8, extending through the top of the compartment 2. This gate prevents the sewage which enters the receiving-compartment 1 from passing into the drying-compartment 2. The wall of the receiving-chamber, opposite to the entrance of the sewer-pipe and preferably at the same height as said pipe, is formed with a series of air-inlet passage-ways 9, and said passage-ways are covered with screens 10. Below the porous floor are arranged a series of outlets 11, through which the liquid which filters through the floor may pass, and a suitable opening 12 is formed at one end of the chamber for the purpose of flushing out the space between the porous floor and the bottom 13 of the chamber when necessary. The chambers 1 and 2 are connected by an air passage-way 14, formed in the partition 3 at aproximately the same height as the sewer-inlet and the passage-ways 9. The drying-chamber 2 is also provided with a filtering-floor 15, and said chamber communicates with a furnace-chamber 16 by means of an air passage-way 17, formed in the lower part of a partition 18. Air ducts or flues 19 lead from the outer atmosphere into the lower part of the drying-chamber at its rear end, said ducts extending down to within a short distance of the floor. A furnace 20 is suitably arranged within the furnace-chamber 16 and adapted to create a draft through the chimney 21. An opening 22 is formed in the side wall between the porous floor 15 of the drying-chamber and the base 26, and an opening 23 is formed in the partition 18 below the porous floor in order that air entering through the passage-way 22 may flow beneath the porous floor and thence up the chimney. Suitable manholes are formed in the tops of the compartments, and said manholes are normally closed by means of covers 24 and 25.

In operation the sewage which enters through the pipe 5 falls upon the porous floor 4, and the greater part of the liquid filters through said floor and passes out of the openings 11 and is conducted away. The draft in the stack causes a continual inflow of fresh air through the openings 9 in the receiving-chamber and through the flues or ducts 19 in the drying-chamber. The air entering the passage-ways 9 flows through the passage-way 14 into the drying-chamber, as indicated by the arrows, and thence into the stack through the passage-way 17. The air flowing through the flues is brought down to within a foot or so of the floor within the drying-chamber, from whence it is also drawn into the stack. In this manner the air is continuously drawn into and through both chambers, and no odors can escape from such chambers except by way of the furnace-chamber, wherein the gases are consumed and the odors largely neutralized.

After a considerable quantity of sediment has accumulated in the receiving-chamber the gate is raised by drawing upward upon the rod 8. The manhole-cover 24 is then raised to permit access to the receiving-chamber, and the sediment in said chamber is shoveled through the gateway 6 into the drying-chamber 2, after which the gate is closed and the cover replaced. The greater part of the water in the sediment will then filter through the floor 15, and the remainder will be rapidly evaporated by the air which is continuously drawn through the drying-chamber in contact with the sediment. The arrangement of the opening 17 and the mouths of the flues 19 close to the floor causes the fresh air to move directly across the material. The air which enters at the passage-way 22 travels beneath the floor 15 and evaporates whatever moisture may pass through the porous floor and dries the bricks when all of the moisture has been evaporated. After the sediment in the chamber 2 has become thoroughly dry the cover 25 is raised and a suitable quantity of kerosene or other inflammable liquid is sprayed or thrown upon the material and ignited. The cover is then replaced, and the smoke and gases from the ignited material pass into the furnace-chamber through the opening 17.

The receiving-chamber is of such capacity that it will only be necessary to burn the material occasionally, and therefore the plant requires little attention aside from the maintaining of a fire in the furnace to create a draft. In the event of the clogging of the floor 4 or of the neglect to shift the material into the drying chamber when necessary the liquid will flow out through the openings 9, and the gratings 10 will retain the sediment. The arrangement of the sewer-pipe and the air-inlets at a considerable distance above the floor permits the receiving-chamber to hold a large quantity of material before overflowing. By locating the air-passages 9 and 14 near the top of the receiving-chamber also the gases, which naturally arise to the top, are drawn off by the air-current without being allowed to accumulate. The current of air entering the opening 22 also aids in increasing the draft in the chimney, and this is desirable, especially when the plant is starting or the fire is low, in order to always maintain a sufficient draft through the receiving and drying compartments.

Dampers 27 are placed at the top of the flues 19 to regulate the draft and also to prevent snow and rain from passing into the drying-chamber.

The apparatus is suitable for hotels or small towns and may be operated at slight expense and with freedom from obnoxious features.

Having described my invention, what I claim, and desire to secure by Letters Patent of the United States, is—

1. A plant for the disposal of sewage comprising separate receiving and drying chambers, each having a porous floor adapted to filter the liquid material from the solid material, said receiving-chamber having air and sewer inlets, a partition separating said chambers, said partition having an air passage-way extending through its upper portion and a valve-controlled opening in its lower portion, and a furnace-chamber connected to said drying-chamber by an air passage-way, said air passage-ways being arranged to provide a continuous draft through the receiving, drying and furnace chambers successively.

2. A plant for the disposal of sewage comprising separate receiving and drying chambers each having an air-inlet and a porous floor adapted to filter the liquid material from the solid material, said receiving-chamber having also a sewer-inlet, a vertical partition separating said chambers, said partition having an air passage-way extending through its upper portion and a valve-controlled opening in its lower portion, and a furnace-chamber connected to said drying-chamber by an air passage-way, said air passage-ways being arranged to provide a continuous draft through the receiving, drying and furnace chambers successively.

3. A plant for the disposal of sewage comprising separate receiving and drying chambers each having an air-inlet and a porous floor adapted to filter the liquid material from the solid material, said receiving-chamber having also a sewer-inlet, a partition between said chambers, said partition having an air passage-way in its upper portion and a valve-controlled opening in its lower portion, a furnace-chamber connected to said drying-chamber by an air passage-way, an air-chamber beneath the drying-chamber, said air-chamber having an inlet-opening and a passage-way communicating with the furnace-chamber.

4. A plant for the disposal of sewage comprising a receiving-chamber having a porous floor, said chamber having a sewer-inlet arranged above said floor and an air-inlet arranged at approximately the same height as the sewer, a drying-chamber separated from said receiving-chamber by a partition and having a porous floor, said partition having an air passage-way therethrough approximately in line with the sewer-inlet and a valve-controlled opening in its lower portion, an air-inlet duct leading to the lower part of the drying-chamber, and a furnace-chamber connected to said drying-chamber by an air passage-way, substantially as described.

5. A plant for the disposal of sewage comprising a receiving-chamber having a porous floor and an air-inlet opening in its upper portion, a drying-chamber adjacent to said receiving-chamber and separated therefrom by a partition, said partition having an air passage-way extending through its upper portion, and a valve-controlled opening in its lower portion, a porous floor for said drying-chamber, said floor being raised above the base or foundation in order to form an air-circulating chamber beneath the floor, and a furnace-chamber connected to said air and drying chambers by suitable air passageways, substantially as described.

In testimony whereof I affix my signature in presence of two witnesses.

JOSEPH DANNER.

Witnesses:
   ROBERT WATSON,
   FLORA LEVI.